C. W. BERRY.
INDICATOR.
APPLICATION FILED AUG. 11, 1910.
1,244,019.
Patented Oct. 23, 1917.
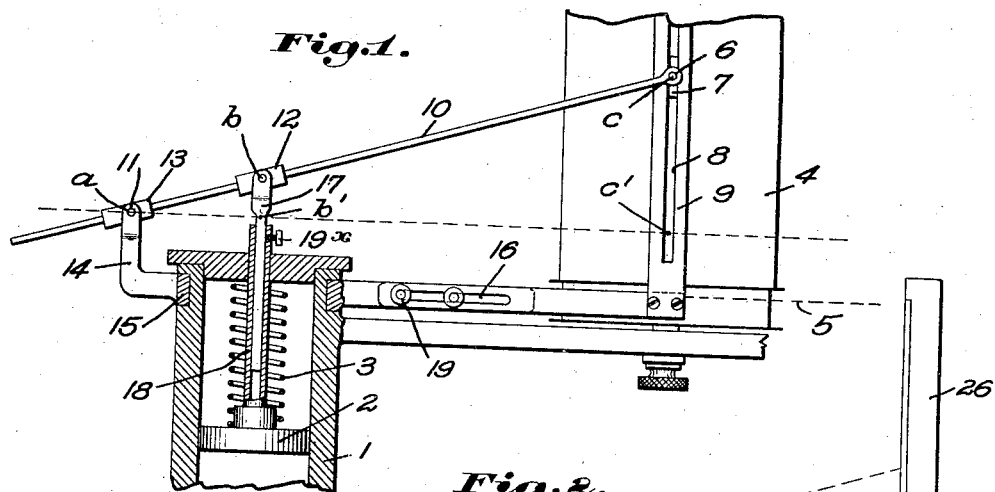
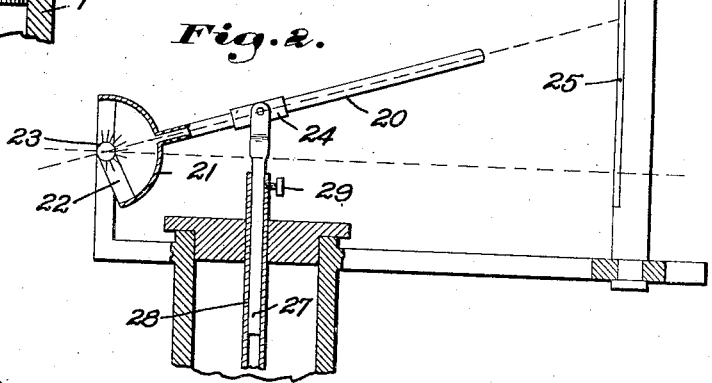
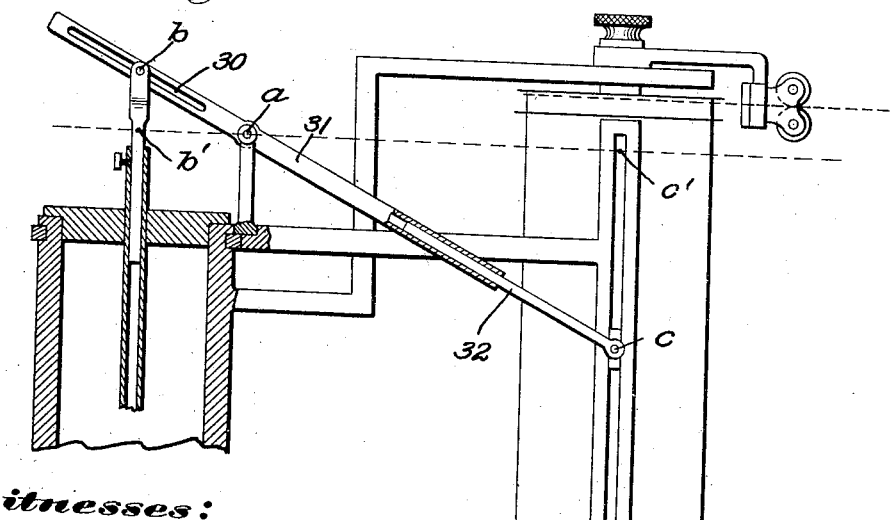
Witnesses:
Ernest A. Telfer
Carl L. Choate
Inventor:
Charles W. Berry
by Emery Booth Janney Varney
Attys.

UNITED STATES PATENT OFFICE.

CHARLES W. BERRY, OF WEST SOMERVILLE, MASSACHUSETTS.

INDICATOR.

1,244,019.  Specification of Letters Patent.  Patented Oct. 23, 1917.

Application filed August 11, 1910. Serial No. 576,655.

*To all whom it may concern:*

Be it known that I, CHARLES W. BERRY, a citizen of the United States, and a resident of West Somerville, county of Middlesex, State of Massachusetts, (whose post-office address is 952 Broadway, West Somerville, Mass.,) have invented an Improvement in Indicators, of which the following description, in connection with the accompanying drawings, is a specification, like letters on the drawings representing like parts.

This invention relates to indicators, relating more particularly to pressure-volume indicators for measuring the pressure-volume of a gas or vapor.

The invention will be best understood by reference to the following description when taken in connection with the accompanying illustration of one specific embodiment thereof, while its scope will be more particularly pointed out in the appended claims.

In the drawings:

Figure 1 is an elevation partly in section and partly broken away, showing an indicator embodying one form of my invention;

Fig. 2 is a similar view showing another form of indicator;

Fig. 3 is a similar view showing still a third modification of the invention.

Referring to the drawings and particularly to the embodiment of the invention illustrated in Fig. 1, there is represented at 1 a common indicator cylinder containing the piston 2, the cylinder having connections (not shown) to the gas or vapor container such as the engine cylinder, so that the piston working against the spring 3 which may be internal or external to the cylinder, helical or flat, occupies a position in the cylinder proportional to the pressure within the container. There is also represented at 4 a conventional form of indicator drum adapted to be turned against the torsion of an interior return spring (not shown) by a suitable connection 5 proportionate to variations in volume, such connection, for example, being had with the cross head of an engine through a usual and suitable reducing motion. The face of the drum 4 being supplied with a suitable recording surface, such as an indicator card, there is caused to be traced on the same, by means of the marker 6, a diagram which, in virtue of the connections hereinafter described, will correctly represent the pressure volume variations of the gas or vapor.

The above-described parts are merely well known parts of the common type of indicator, conventionally represented, and are shown for illustration only, the principles of my invention being applicable to indicators of widely different types.

In the form shown in Fig. 1 the marker 6 is carried by a sliding block 7, the latter being constrained to move in a vertical slot 8 parallel with the axis of the drum 4 and formed in the fixed, upright arm 9. Vertical movement is imparted to the block 7 by pivotal connection to the end of the radial arm 10, which latter is caused reciprocatively to swing about the pivot 11 by a vertical movement of the sleeve 12, the latter connected to the indicator piston 2 and so arranged as to permit the arm 10 to slide freely therethrough.

The arm 10 is connected to the pivot point 11 by means of the sleeve 13 through which it has free sliding movement, the sleeve 13 being pivoted at 11 to an upright bracket 14 fastened to the collar 15, the latter also carrying the arm 16 which supports the upright block guiding arm 9. The collar 15 can therefore be turned on the cylinder to withdraw the marker from or advance it toward the indicator drum, the remaining connected parts moving with it, including the arm 9, supports 16 and 14, and the radial arm 10.

The sleeve 12 is pivoted to a rod 17, the latter having a telescopic connection with the tubular piston rod 18 so that the sleeve can be adjusted to different distances from the piston and there clamped by means of the set screw $19^x$.

Referring to the letter designations of Fig. 1, it will be seen that the distance $cc'$ from the marker 6 to the horizontal line drawn through the pivot point 11 always bears to the distance $bb'$ (the distance from the pivoted sleeve 12 to the same horizontal line) the same ratio as $ac'$ bears to $ab'$. That is to say, the vertical displacement of $cc'$ of the pencil point $c$ is always proportional to that of $b$ and, therefore, proportional to the pressure exerted upon the piston. The relative vertical movement between the marker and indicator card will therefore correctly record variations in pressure, and the relative horizontal movement will correctly record variations in volume.

The multiplying power of the pencil motion can readily be changed by adjusting the distance from the center of the pressure cylinder to the center of the slot 8, that is to say adjusting the distance $b'c'$, or it may be changed by adjusting the distance from the center of the cylinder to the pivotal point 11, that is to say the distance $ab'$. This follows from the fact that the motion of the piston is always multiplied by the ratio $\frac{ac'}{ab'}$. The scale of the indicator diagram may therefore be altered by adjusting either distance. $ab'$ or $b'c'$, or by changing the strength of the indicator spring. In the form shown, I have represented the arm 16 as adjustable relatively to the collar 15 to vary the distance $b'c'$ by means of the set screw 19 and the coöperating slots, but the support 14 might be made adjustable if desired to vary the distance $ab'$.

It will be obvious that after the indicator spring is in position the distance $bb'$ should be adjusted by means of the adjusting screw 19×, or other equivalent device, so that such distance $bb'$ will correctly represent the atmospheric pressure in terms of the strength of the indicator spring, if it is desirable to consider the point $c'$ as the zero of pressure.

The described form of instrument, as compared with common types of indicators in use, materially reduces the number of parts required to obtain a parallel motion, which in this case is exact and not simply approximate, and decreases the inertia of the marker actuating members, affording thereby greater sensitiveness and adaptability to high speed work.

The described form of indicator also possesses the further advantage that the same type of pencil motion may be employed for both mechanical and optical records, the optical form being highly sensitive and adapted for much higher speeds than the regular indicators. The optical form has the further advantage that the usual indicator spring of constant rate of compressibility or extension may be employed in place of the diaphragm which is now utilized in connection with the common form of optical indicators, and which does not possess a uniform rate of distortion.

In Fig. 2 I have shown the same principle adapted to an optical form of instrument. Herein the radial member 20 is in the form of a ray of light determined in position by a hollow tube projecting from the shield or screen 21, the latter supported by arms 22 and adapted to oscillate about a center which coincides with the source of light 23. The latter may be produced by an incandescent lamp or any other suitable means. As the piston moves up or down its motion is transmitted to the radial member through the pivoted sleeve 24 as in the form shown in Fig. 1 and is recorded in magnified scale by means of the ray of light passing through the tube 20 and projected upon a photographic plate 25. The latter is arranged parallel to the axis of the pressure cylinder and normal to the plane of the ray of light, being supported upon a plate carrier 26 which is given a movement across the plane of the light ray under control of the cross head so as to provide volume displacements. The end of the ray of light where it impinges upon the recording surface corresponds to the marker 6 shown in Fig. 1. If desired a film could be mounted upon a drum and both plate and film could be used so as to take continuous diagrams. In the practical construction of this instrument the plate 25 will be suitably protected against exposure of light other than that received through the tube 20.

It will be evident that the action of this instrument is substantially the same as that of the instrument shown in Fig. 1, the relative movements of the ray of light controlled or positioned by the radial member 20 and the plate 25 producing a diagram which correctly depicts pressure-volume variations.

Atmospheric adjustment for the scale of the indicator spring may be effected as before by the telescopic connection between the rod 27 and the tubular piston rod 28, the adjusting screw 29 being employed to clamp the two in fixed relation.

In Fig. 3 I have shown a modified form of the mechanical instrument illustrated in Fig. 1 wherein the pivot $a$ is placed between the points $b$ and $c$. This necessitates travel in opposite directions by the points $b$ and $c$. Herein the indicator piston is connected to a pin sliding in a slot 30 provided by the radial member 31, the radial member being prolonged to connect with the marker by means of the part 32 having a sliding telescopic connection with the part 31. It will be evident that the same principles explained with reference to the instrument of Fig. 1 apply to the instrument of Fig. 3. The latter instrument may be constructed in either the mechanical or optical type, the embodiment of the optical type of Fig. 2 in the form of an instrument such as is shown in Fig. 3 being obvious.

It will be observed that in the several types illustrated the radial pivoted member receives its impulse from a pressure-responsive means guided along a straight line parallel to the line of piston motion and that it imparts motion to a responsive member along a second parallel line, these lines being at a fixed distance from the pivot about which the radial line oscillates. The distances between the pivot and the two points determined by the intersections of this radial member and these two lines of action of the impelling and impelled means possess different lengths for each angular position of the radial member. To provide for these varying lengths any one of the three points may be used as a fixed pivotal connection, while the other two connections are provided with suitable sliding connections such as a rod and sleeve, or a pin and slot, or a ray of light, and the like, or all three points may be fixed pivots with the intervening lengths extensible as by telescopic joints.

It will be observed that in each of the described instruments variations in fluid-pressure are utilized for producing angular displacements of the radial member from a zero position normal to the line of action of the pressure responsive means so as to cause the tangent of this angular displacement to be always proportional to the fluid-pressure and such angular displacements are further utilized to produce records of the pressure fluctuations to any desired degree of magnification by locating the recording surface at any required distance from the center of oscillation.

I have termed the members 10, 20 and 31 "radial directing members" as aptly suggesting their functions. As in a mathematical sense a point may be located with reference to a fixed set of coördinate axes by means of polar coördinates, i. e., by means of a radius vector and a vectorial angle, so is the marker located with reference to the pressure and volume axes by the use of the embodiment of a radius vector in the form of the radial directing member which assumes different angular positions and different lengths under the combined action of pressure and volume change.

The modified forms of instruments shown in Figs. 2 and 3 for simplicity are shown without the provision of adjustments for adjusting the distances $ab'$ or $b'c'$, but it will be understood that means for making one or both of such adjustments may be employed upon these instruments as well as upon the instrument shown in Fig. 1.

It will be observed, however, that the choice of the zero line is not necessarily confined to the normal passing through the point of oscillation as equal displacements of the marker at any point of its path correspond to equal pressure differences. That is, any position of the radial member may be taken as zero. This pencil motion thus possesses the same universality of choice of zero as is enjoyed by other types and at the same time produces a true straight line magnification of the motions of the piston throughout its entire course. By so adjusting the distance between the radial member and the piston that the latter oscillates equally above and below the normal, through the center of oscillation the total displacement of the marker is obtained with a minimum length of the radial member between the marker and the pivot, so that the inertia of the recorder motion which varies with the distance of the mass from the center of oscillation is reduced to a minimum and the instrument is in its most sensitive position.

While I have herein shown and described one specific form of the invention for illustrative purposes, it is to be understood that the same is not limited thereto, but that extensive deviations may be made in the form, construction and arrangement of parts and the type of instrument employed without departing from the spirit of the invention.

Claims:

1. In an indicator, the combination with an indicator cylinder having a pressure-responsive piston, of a radial pivoted member swinging in a plane parallel to the axis of the indicator cylinder and connected to the piston thereof to be moved thereby, a record medium responsive to light, and a source of light at the pivotal point of said pivoted member, the latter being adapted to transmit the same along its axis to the recording medium.

2. In an indicator, the combination with a pressure-responsive impelling means, a recording surface responsive to light and arranged parallel with the movement of the impelling means, a radial member oscillating about a fixed pivot, and a source of light at the pivotal point thereof, said radial member being tubular in form to project the light upon said recording surface.

3. In an indicator the combination with a pressure-responsive member, a spring, a marker, a recording surface locationally responsive to volume variations, a variable length radial member impelled by said pressure-responsive means and terminating in said marker, an adjustment in said pressure-responsive member whereby said radial member may be adjusted to occupy the correct pressure position in terms of the scale of said spring with reference to the zero pressure line determined by the pivotal point of said radial member, means for adjusting the distance between said pivot and said recording surface whereby the scale of the diagram may be varied without varying the strength of the spring.

4. In an indicator the combination with a marker of a recording surface, pressure-responsive impelling means, a member impelled thereby and constrained to oscillate about a fixed point and further constrained at the marker end to traverse a straight line parallel to the line of action of the impelling means, said member being of variable length between the marker and the pivot, a device by means of which said oscillating member can be adjusted with reference to a zero pressure line, and means for adjusting the distance between said pivot and said recording surface so as to vary the scale of the diagram.

5. In an indicator the combination with a recording surface of recording means including a pivoted directing member for directing the tracing of the record thereon, means for adjusting it correctly with relation to the zero pressure line, impelling means connected to the directing member, and means for adjusting the relation of the distance from the pivot point to the recording surface to the distance from the pivot point to the impelling means.

6. In an indicator, the combination with a recording drum of a supporting arm therefor, means for turning the drum, a pivoted directing member to direct the tracing of the record over the surface of the drum, a pressure responsive member to move the directing member in response to variations in pressure, and means for adjusting the distance of the drum from the pressure responsive member.

7. In an indicator, the combination with a recording surface of recording means including a pivoted directing member for directing the tracing of the record on said surface, impelling means connected to the directing member, and means for adjusting the distance of the recording surface from the connection of the directing member to the impelling means.

8. In an indicator, the combination with a spring of fixed strength, of a recording arm and a recording surface, impelling means for moving the recording arm, and means for adjusting the distance between the recording surface and the connection of the impelling means to the recording arm, thereby to vary the scale of the diagram.

9. In an indicator, the combination with a marker of a recording surface, a pressure responsive impelling means, a radial member impelled by said pressure responsive means and constrained to oscillate about a fixed point on the indicator and further constrained at the marker to traverse a straight path parallel to the line of action of the impelling means, a scale adjusting device by which said member is caused to oscillate in its most sensitive position, and means for varying the distance between the recording surface and the line of action of the impelling means.

In testimony whereof, I have signed my name to this specification, in the presence of two subscribing witnesses.

CHARLES W. BERRY.

Witnesses:
   ROBERT H. KAMMLER,
   E. EDNA SPRY.

Copies of this patent may be obtained for five cents each, by addressing the "Commissioner of Patents, Washington, D. C."